US012803198B2

(12) United States Patent
Wu et al.

(10) Patent No.: US 12,803,198 B2
(45) Date of Patent: Nov. 17, 2026

(54) ELECTRICAL CONNECTOR HAVING PULL STRIP

(71) Applicant: ACES Electronics Co., Ltd., Taoyuan City (TW)

(72) Inventors: Chu Cheng Wu, Taoyuan City (TW); Kuo Hua Huang, Taoyuan City (TW)

(73) Assignee: ACES Electronics Co., Ltd., Taoyuan City (TW)

( * ) Notice: Subject to any disclaimer, the term of this patent is extended or adjusted under 35 U.S.C. 154(b) by 379 days.

(21) Appl. No.: 18/592,547

(22) Filed: Mar. 1, 2024

(65) Prior Publication Data

US 2025/0279604 A1 Sep. 4, 2025

(51) Int. Cl.
*H01R 12/77* (2011.01)
*H01R 13/633* (2006.01)

(52) U.S. Cl.
CPC ....... *H01R 12/771* (2013.01); *H01R 13/6335* (2013.01)

(58) Field of Classification Search
CPC .............. H01R 12/771; H01R 13/6335; H01R 12/772; H01R 12/79; H01R 12/774; H01R 13/506; H01R 13/6275
See application file for complete search history.

(56) References Cited

U.S. PATENT DOCUMENTS

| | | | | |
|---|---|---|---|---|
| 7,771,225 | B1 * | 8/2010 | Wu | H01R 13/65912 439/372 |
| 8,597,045 | B2 * | 12/2013 | Zhu | H01R 13/6582 439/357 |
| 9,496,645 | B2 * | 11/2016 | Reed | H01R 13/629 |
| 10,283,894 | B2 * | 5/2019 | Salmons | H01R 13/6215 |
| 11,569,615 | B1 * | 1/2023 | Sun | H01R 13/6335 |

* cited by examiner

*Primary Examiner* — Edwin A. Leon
(74) *Attorney, Agent, or Firm* — CKC & Partners Co., LLC

(57) ABSTRACT

An electrical connector includes a connector body, at least one cable, and a pull strip. The cable is electrically connected to the connector body. The pull strip includes a connection portion, a winding portion, and a grip portion. Two ends of the connection portion respectively connect the connector body and the winding portion. The winding portion is located between the connection portion and the grip portion. When the winding portion is in an unfolded state, the lengthwise direction of the winding portion is perpendicular to the lengthwise direction of the cable. When the winding portion is in a folded state, the winding portion surrounds the cable. The grip portion is configured to receive a pulling force.

18 Claims, 6 Drawing Sheets

ELECTRICAL CONNECTOR HAVING PULL STRIP

BACKGROUND

Field of Invention

The present disclosure relates to an electrical connector.

Description of Related Art

In order to realize electrical connections between different electronic devices, various types of electrical connectors already exist. Electrical connectors may include wire end connectors and board end connectors based on their location. The wire end connector is located on one end of a cable and is used to couple with the board end connector, while the board end connector is disposed on a printed circuit board. With the continuous technological advancement and innovation of various electronic products, the performance of new electronic products has been greatly improved, and the types of electrical signals have become more diverse and require more bandwidth.

The traditional wire end connector may have a pull strip to facilitate the user to apply a pulling force to detach the wire end connector from the board end connector. However, the pull strip has no fool-proof design and may be pulled in different directions. As a result, the line end connector and the board end connector may not be unlocked, which may cause damage to the connector and reduce service life. In addition, when the wire end connector is assembled, the pull strip needs to be assembled with the cable before being fastened to the housing of the connector, which is not conducive to assembly time and labor costs.

SUMMARY

According to some embodiments of the present disclosure, an electrical connector includes a connector body, at least one cable, and a pull strip. The cable is electrically connected to the connector body. The pull strip includes a connection portion, a winding portion, and a grip portion. Two ends of the connection portion respectively connect the connector body and the winding portion. The winding portion is located between the connection portion and the grip portion. When the winding portion is in an unfolded state, the lengthwise direction of the winding portion is perpendicular to the lengthwise direction of the cable. When the winding portion is in a folded state, the winding portion surrounds the cable. The grip portion is configured to receive a pulling force.

In some embodiments, a first end of the winding portion is a back adhesive area having an adhesive layer.

In some embodiments, when the winding portion is in the folded state, the first end of the winding portion overlaps a second end of the winding portion, such that the adhesive layer is located between the first end and the second end of the winding portion.

In some embodiments, the first end of the winding portion has a protruding portion, the winding portion has a positioning opening, and when the winding portion is in the folded state, the protruding portion is inserted into the positioning opening so as to be fastened.

In some embodiments, the adhesive layer extends to the protruding portion.

In some embodiments, when the winding portion is in the unfolded state, a distance between two ends of the winding portion is greater than a width of the grip portion, and the width of the grip portion is greater than a width of the connection portion.

In some embodiments, when the winding portion is in the unfolded state, the pull strip is a cross-shaped structure.

In some embodiments, the pull strip includes more than two material areas, and the material areas selectively include plastic elements and metal elastic elements.

In some embodiments, the connection portion of the pull strip is one of the material areas, and the winding portion and the grip portion are another one of the material areas.

In some embodiments, the number of the cables is two, the two cables are in a parallel arrangement, and the winding portion surrounds the two cables when the winding portion is in the folded state.

According to some embodiments of the present disclosure, an electrical connector includes a connector body, at least one cable, and a pull strip. The pull strip connects the connector body and includes a winding portion. When the winding portion is in an unfolded state, the pull strip is a cross-shaped structure. When the winding portion is in a folded state, the winding portion surrounds the cable.

In some embodiments, the pull strip further includes a connection portion and a grip portion, two ends of the connection portion respectively connect the connector body and the winding portion, the winding portion is located between the connection portion and the grip portion, and the grip portion is configured to receive a pulling force.

In some embodiments, a first end of the winding portion is a back adhesive area having an adhesive layer.

In some embodiments, when the winding portion is in the folded state, the first end of the winding portion overlaps a second end of the winding portion, such that the adhesive layer is located between the first end and the second end of the winding portion.

In some embodiments, wherein the first end of the winding portion has a protruding portion, the winding portion has a positioning opening, and when the winding portion is in the folded state, the protruding portion is inserted into the positioning opening so as to be fastened.

In some embodiments, the adhesive layer extends to the protruding portion.

In some embodiments, when the winding portion is in the unfolded state, a distance between two ends of the winding portion is greater than a width of the cable.

In some embodiments, the pull strip includes more than two material areas, and the material areas selectively include plastic elements and metal elastic elements.

In some embodiments, the winding portion of the pull strip is one of the material areas.

In some embodiments, the number of the cables is two, the two cables are in a parallel arrangement, and the winding portion surrounds the two cables when the winding portion is in the folded state.

In the aforementioned embodiments of the present disclosure, since the pull strip of the electrical connector has the winding portion between the connection portion and the grip portion, and the lengthwise direction of the winding portion is perpendicular to the lengthwise direction of the cable when the winding portion is in the unfolded state, the winding portion can be bent into a ring shape in the folded state such that the cable is surrounded by the winding portion. In such a design, not only the user can exert a pulling force through the grip portion of the pull strip to detach the electrical connector from a mating connector, but also the winding portion can restrain the cable and limit the pull strip from being pulled in the lengthwise direction of the cable. As a result, it ensures that the electrical connector and the mating connector can be unlocked smoothly, thereby preventing damage to the connector and extending service life. Moreover, when the electrical connector is assembled, the pull strip can be bent to surround the cable to be fastened after the connector body is assembled to the cable, which can reduce assembly time and labor costs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
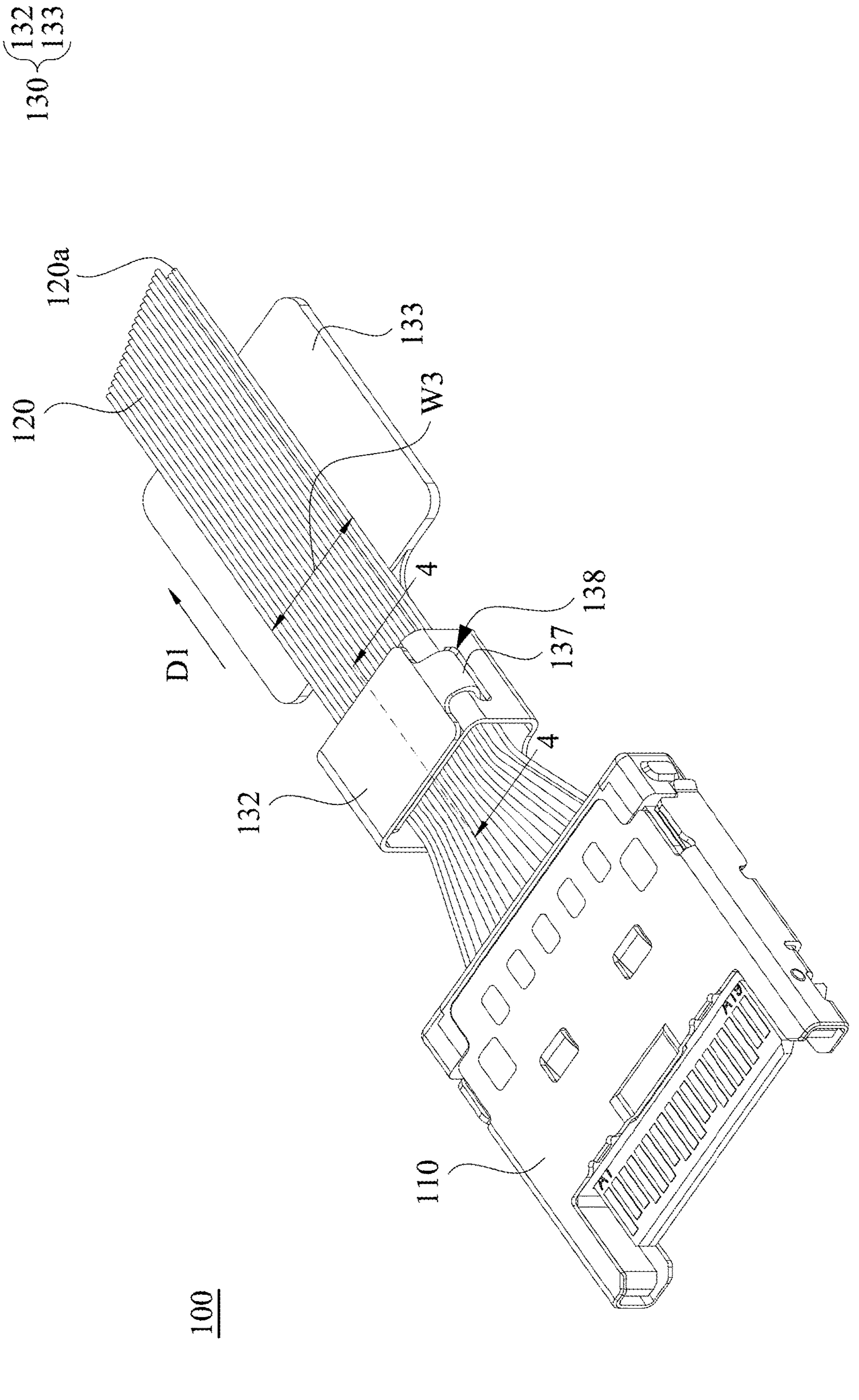
FIG. 1 is a perspective view of an electrical connector according to one embodiment of the present disclosure when a pull strip of the electrical connector is in a folded state.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
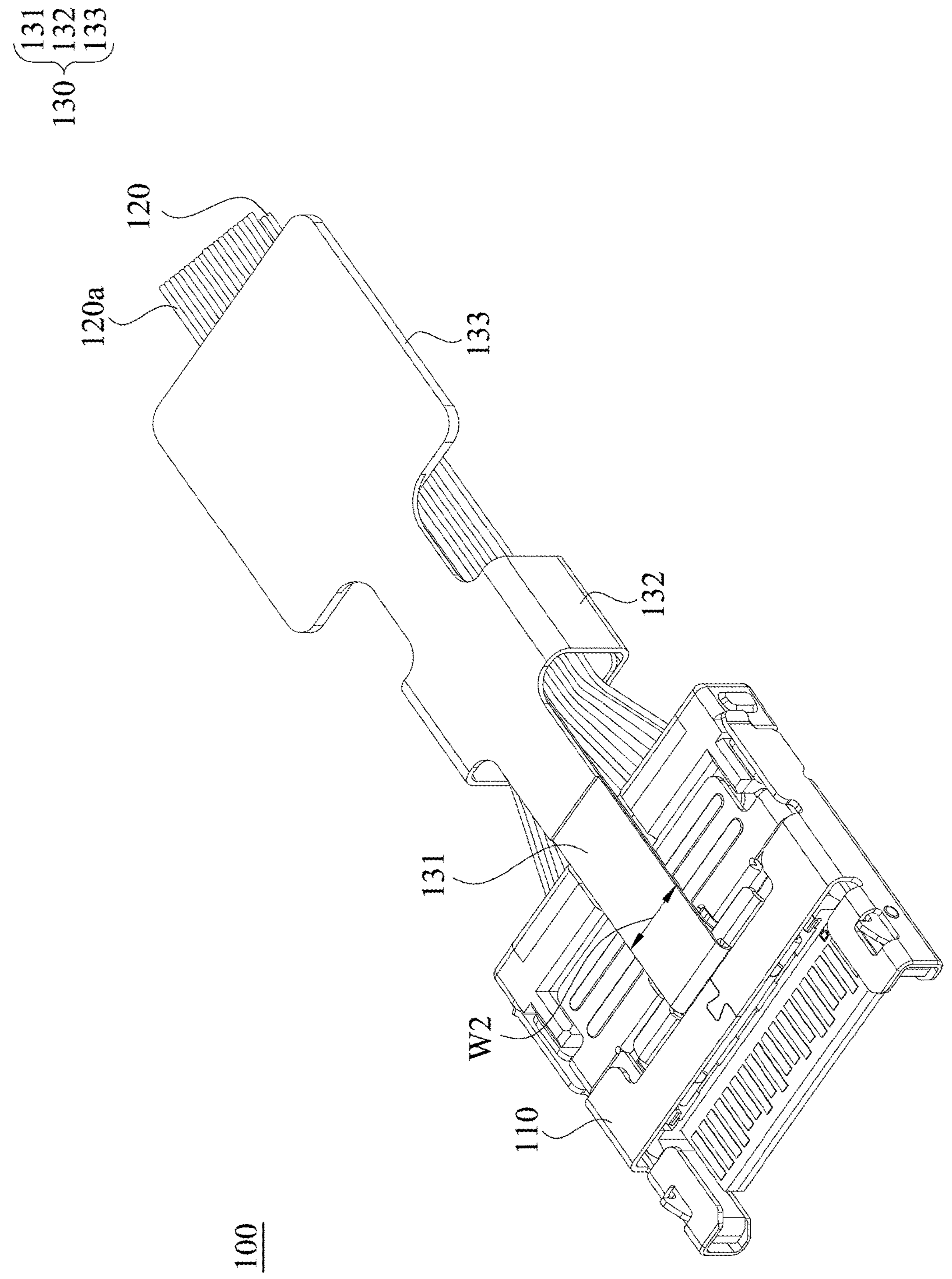
FIG. 2 is a perspective view of the electrical connector of FIG. 1 when viewed from below.

FIG. 1 is a perspective view of an electrical connector 100 according to one embodiment of the present disclosure when a pull strip 130 of the electrical connector 100 is in a folded state. FIG. 2 is a perspective view of the electrical connector 100 of FIG. 1 when viewed from below. As shown in FIG. 1 and FIG. 2, the electrical connector 100 includes a connector body 110, cables 120 and 120*a*, and the pull strip 130. The electrical connector 100 is a wire end connector. The cables 120 and 120*a* are electrically connected to the connector body 110. The pull strip 130 includes a connection portion 131, a winding portion 132, and a grip portion 133. Two ends of the connection portion 131 respectively connect the connector body 110 and the winding portion 132. The winding portion 132 is located between the connection portion 131 and the grip portion 133. When the winding portion 132 of the pull strip 130 is in the folded state, the winding portion 132 surrounds the cables 120 and 120*a*. The grip portion 133 is configured to receive a pulling force from the user. In this embodiment, the number of the cables 120 and 120*a* is two, and the two cables 120 and 120*a* are in a parallel arrangement with upper and lower layers, but the present disclosure is not limited in this regard. In another embodiment, the connector body 110 may connect a single-layer cable or cables with more than three layers, as long as the cable can be surrounded by the winding portion 132 of the pull strip 130.

Figure 3:
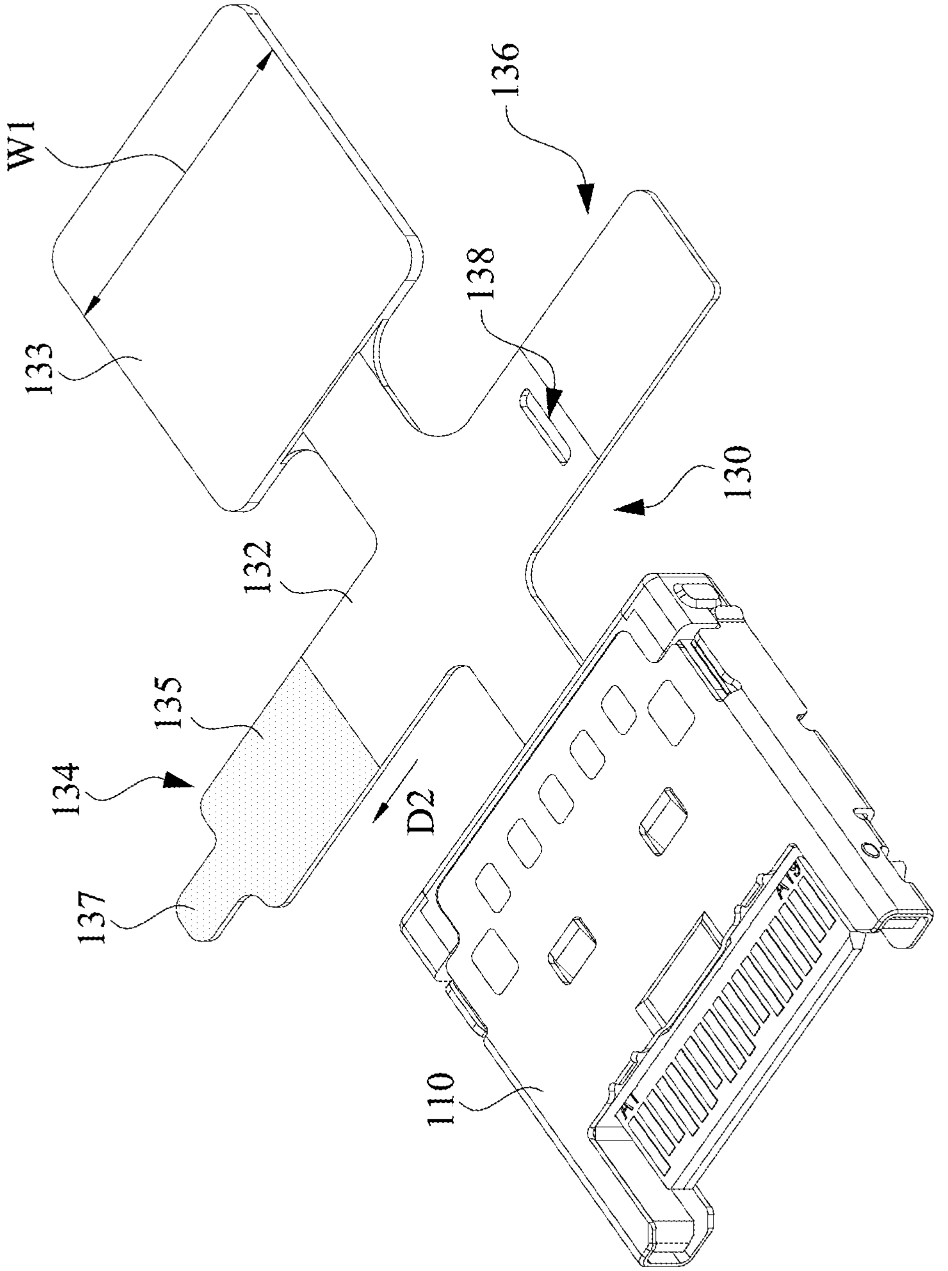
FIG. 3 is a perspective view of the electrical connector of FIG. 1 when the pull strip of the electrical connector is in an unfolded state.

FIG. 3 is a perspective view of the electrical connector 100 of FIG. 1 when the pull strip 130 of the electrical connector 100 is in an unfolded state. In order to simplify the drawing, the cables 120 and 120*a* of FIG. 1 are omitted in FIG. 3. As shown in FIG. 1 and FIG. 3, the cables 120 and 120*a* has a lengthwise direction D1. When the winding portion 132 of the pull strip 130 is in the unfolded state, a lengthwise direction D2 of the winding portion 132 is perpendicular to the lengthwise direction D1 of the cables 120 and 120*a*. As a result, when the winding portion 132 is in the unfolded state, the pull strip 130 can be a cross-shaped structure, as shown in FIG. 3.

Specifically, since the pull strip 130 of the electrical connector 100 has the winding portion 132 between the connection portion 131 (see FIG. 2) and the grip portion 133, and the lengthwise direction D2 of the winding portion 132 is perpendicular to the lengthwise direction D1 of the cables 120 and 120*a* when the winding portion 132 is in the unfolded state, the winding portion 132 can be bent into a ring shape in the folded state such that the cables 120 and 120*a* are surrounded by the winding portion 132. In such a design, not only the user can exert a pulling force through the grip portion 133 of the pull strip 130 to detach the electrical connector 100 from a mating connector, but also the winding portion 132 of the pull strip 130 can restrain the cables 120 and 120*a* and limit the pull strip 130 from being pulled in the lengthwise direction D1 of the cables 120 and 120*a*. As a result, it ensures that the electrical connector 100 and the mating connector can be unlocked smoothly, thereby preventing damage to the connector and extending service life. Moreover, when the electrical connector 100 is assembled, the pull strip 130 can be bent to surround the cables 120 and 120*a* to be fastened after the connector body 110 is assembled to the cables 120 and 120*a*, which can reduce assembly time and labor costs.

In this embodiment, a first end of 134 the winding portion 132 of the pull strip 130 has a protruding portion 137, and the winding portion 132 has a positioning opening 138. When the winding portion 132 is in the folded state, the protruding portion 137 can be inserted into the positioning opening 138 so as to be fastened, thereby fixing the winding portion 132 to be a ring shape and restraining the cables 120 and 120*a*.

Figure 4:
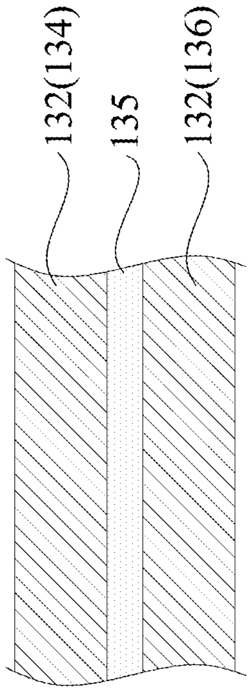
FIG. 4 is a cross-sectional view of a winding portion of the pull strip of FIG. 1 taken along line 4-4.

FIG. 4 is a cross-sectional view of the winding portion 132 of the pull strip 130 of FIG. 1 taken along line 4-4. As shown in FIG. 3 and FIG. 4, the winding portion 132 of the pull strip 130 has a second end 136 distal to the first end 134. The first end 134 of the winding portion 132 is a back adhesive area having an adhesive layer 135. When the winding portion 132 of the pull strip 130 is in the folded state, the first end 134 of the winding portion 132 overlaps the second end 136 of the winding portion 132, such that the adhesive layer 135 is located between the first end 134 and the second end 136 of the winding portion 132. The adhesive layer 135 may fix the winding portion 132 to be a ring shape, thereby restraining the cables 120 and 120*a*. In this embodiment, the adhesive layer 135 may extend to the protruding portion 137 of the winding portion 132, thereby improving stability when the protruding portion 137 is inserted into the positioning opening 138.

As shown in FIG. 2 and FIG. 3, when the winding portion 132 of the pull strip 130 is in the unfolded state, a distance between two ends (i.e., the first end 134 and the second end 136) of the winding portion 132 is greater than a width W1 of the grip portion 133, and the width W1 of the grip portion 133 is greater than a width W2 of the connection portion 131. As shown in FIG. 1 and FIG. 3, when the winding portion 132 of the pull strip 130 is in the unfolded state, the distance between the two ends (i.e., the first end 134 and the second end 136) of the winding portion 132 is greater than a width W3 of the cables 120 and 120*a*.

As shown in FIG. 2 and FIG. 3, the pull strip 130 includes more than two material areas, and each of the material areas may be composed of more than two materials. For example, the material areas may selectively include plastic elements (e.g., PET) and metal elastic elements. In some embodiments, the connection portion 131 of the pull strip 130 is one of the material areas, and the winding portion 132 and the grip portion 133 are another one of the material areas. In some embodiments, the connection portion 131 may be a plastic element, and the winding portion 132 and the grip portion 133 may be metal elastic elements. In some embodiments, the connection portion 131 may be a metal elastic element, and the winding portion 132 and the grip portion 133 may be plastic elements. In some embodiments, the connection portion 131 may be a plastic element, and each of the winding portion 132 and the grip portion 133 may be a composite material composed of a plastic element and a metal elastic element.

It is to be noted that the connection relationships, the materials, and the advantages of the elements described above will not be repeated in the following description. In the following description, other types of electrical connectors will be explained.

Figure 5:
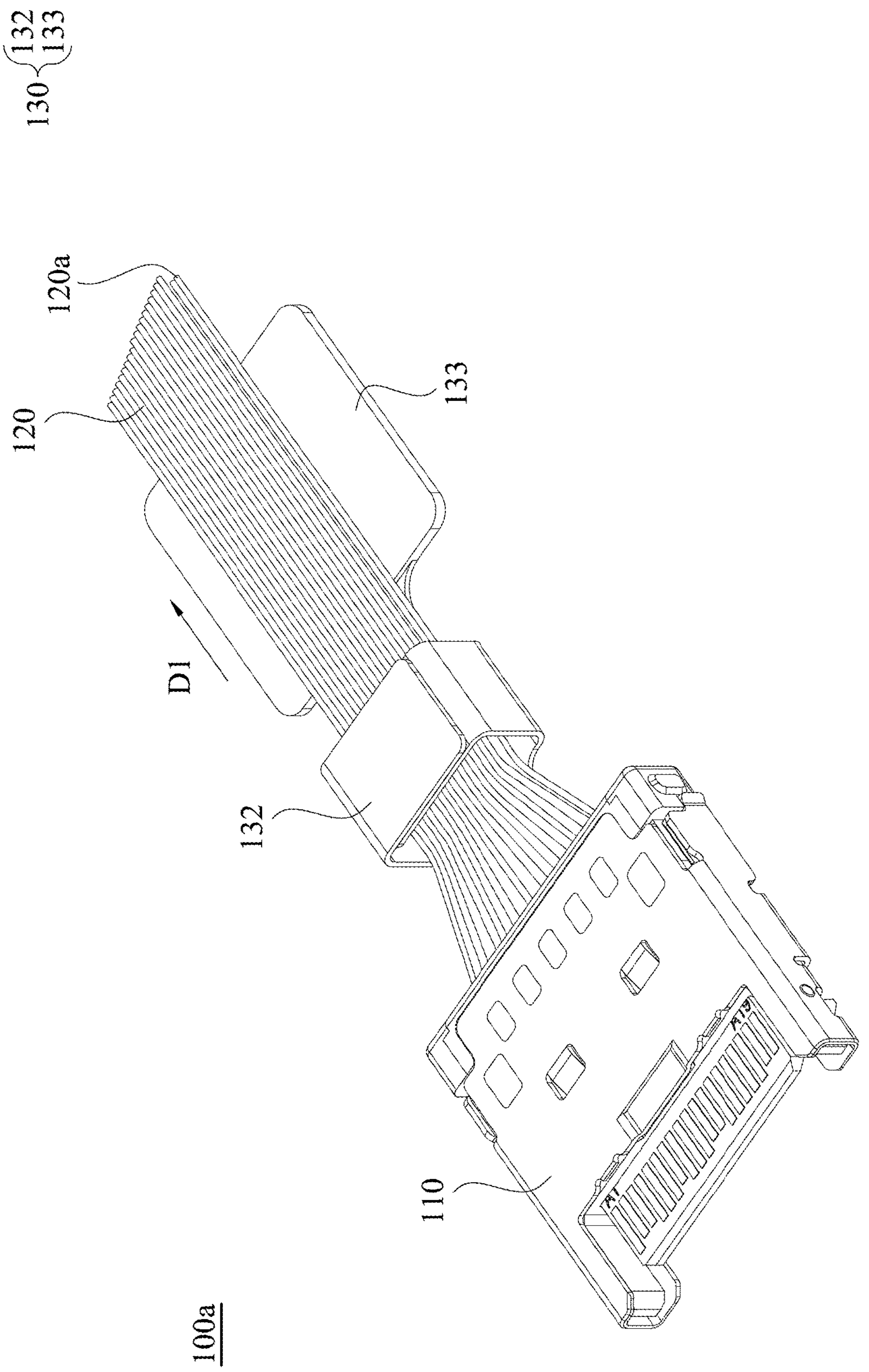
FIG. 5 is a perspective view of an electrical connector according to another embodiment of the present disclosure when the pull strip of the electrical connector is in a folded state.
Figure 6:
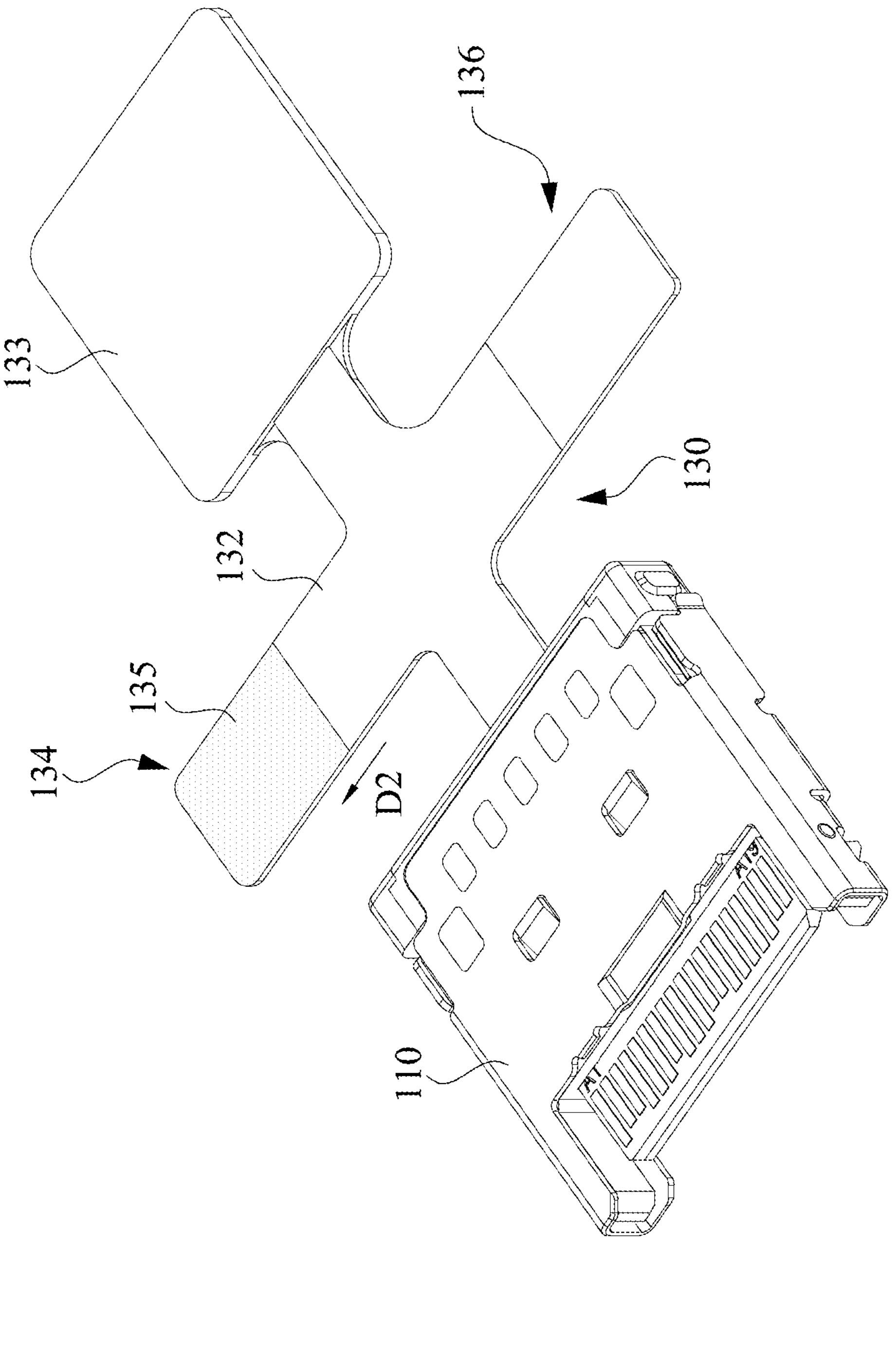
FIG. 6 is a perspective view of the electrical connector of FIG. 5 when the pull strip of the electrical connector is in an unfolded state.

FIG. 5 is a perspective view of an electrical connector 100*a* according to another embodiment of the present disclosure when the pull strip 130 of the electrical connector 100*a* is in a folded state. FIG. 6 is a perspective view of the electrical connector 100*a* of FIG. 5 when the pull strip 130 of the electrical connector 100*a* is in an unfolded state. As shown in FIG. 5 and FIG. 6, the electrical connector 100*a* includes the connector body 110, the cables 120 and 120*a*, and the pull strip 130. The difference between this embodiment and the embodiment of FIGS. 1 and 3 is that the first end 134 of the winding portion 132 of the pull strip 130 of the electrical connector 100*a* has no protruding portion 137, and the winding portion 132 has no positioning opening 138. The first end 134 of the pull strip 130 is a back adhesive area having the adhesive layer 135. When the winding portion 132 of the pull strip 130 of the electrical connector 100*a* is in the folded state, the first end 134 of the winding portion 132 overlaps the second end 136 of the winding portion 132, such that the adhesive layer 135 is located between the first end 134 and the second end 136 of the winding portion 132, in which the cross-sectional structure is the same as shown in FIG. 4. The adhesive layer 135 may fix the winding portion 132 to be a ring shape, thereby restraining the cables 120 and 120*a*.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrical connector, comprising:

a connector body;

at least one cable electrically connected to the connector body; and a pull strip comprising a connection portion, a winding portion, and a grip portion, wherein two ends of the connection portion respectively connect the connector body and the winding portion, the winding portion is located between the connection portion and the grip portion, a first end of the winding portion is a back adhesive area having an adhesive layer, and when the winding portion is in an unfolded state, a lengthwise direction of the winding portion is perpendicular to a lengthwise direction of the cable, and when the winding portion is in a folded state, the winding portion surrounds the cable, and the grip portion is configured to receive a pulling force.

2. The electrical connector of claim 1, wherein when the winding portion is in the folded state, the first end of the winding portion overlaps a second end of the winding portion, such that the adhesive layer is located between the first end and the second end of the winding portion.

3. The electrical connector of claim 2, wherein the first end of the winding portion has a protruding portion, the winding portion has a positioning opening, and when the winding portion is in the folded state, the protruding portion is inserted into the positioning opening so as to be fastened.

4. The electrical connector of claim 3, wherein the adhesive layer extends to the protruding portion.

5. The electrical connector of claim 1, wherein when the winding portion is in the unfolded state, a distance between two ends of the winding portion is greater than a width of the grip portion, and the width of the grip portion is greater than a width of the connection portion.

6. The electrical connector of claim 1, wherein when the winding portion is in the unfolded state, the pull strip is a cross-shaped structure.

7. The electrical connector of claim 1, wherein the pull strip comprises more than two material areas, and the material areas selectively comprise plastic elements and metal elastic elements.

8. The electrical connector of claim 7, wherein the connection portion of the pull strip is one of the material areas, and the winding portion and the grip portion are another one of the material areas.

9. The electrical connector of claim 1, wherein the number of the cables is two, the two cables are in a parallel arrangement, and the winding portion surrounds the two cables when the winding portion is in the folded state.

10. An electrical connector, comprising:
a connector body;
at least one cable electrically connected to the connector body; and
a pull strip connecting the connector body and comprising a winding portion, wherein a first end of the winding portion is a back adhesive area having an adhesive layer, when the winding portion is in an unfolded state, the pull strip is a cross-shaped structure, and when the winding portion is in a folded state, the winding portion surrounds the cable.

11. The electrical connector of claim 10, wherein the pull strip further comprises a connection portion and a grip portion, two ends of the connection portion respectively connect the connector body and the winding portion, the winding portion is located between the connection portion and the grip portion, and the grip portion is configured to receive a pulling force.

12. The electrical connector of claim 10, wherein when the winding portion is in the folded state, the first end of the winding portion overlaps a second end of the winding portion, such that the adhesive layer is located between the first end and the second end of the winding portion.

13. The electrical connector of claim 12, wherein the first end of the winding portion has a protruding portion, the winding portion has a positioning opening, and when the winding portion is in the folded state, the protruding portion is inserted into the positioning opening so as to be fastened.

14. The electrical connector of claim 13, wherein the adhesive layer extends to the protruding portion.

15. The electrical connector of claim 10, wherein when the winding portion is in the unfolded state, a distance between two ends of the winding portion is greater than a width of the cable.

16. The electrical connector of claim 10, wherein the pull strip comprises more than two material areas, and the material areas selectively comprise plastic elements and metal elastic elements.

17. The electrical connector of claim 16, wherein the winding portion of the pull strip is one of the material areas.

18. The electrical connector of claim 10, wherein the number of the cables is two, the two cables are in a parallel arrangement, and the winding portion surrounds the two cables when the winding portion is in the folded state.

* * * * *